June 12, 1951 B. E. DEL MAR 2,556,470
HEAT INSULATING STRUCTURAL PANEL
Filed Nov. 22, 1947 2 Sheets-Sheet 2

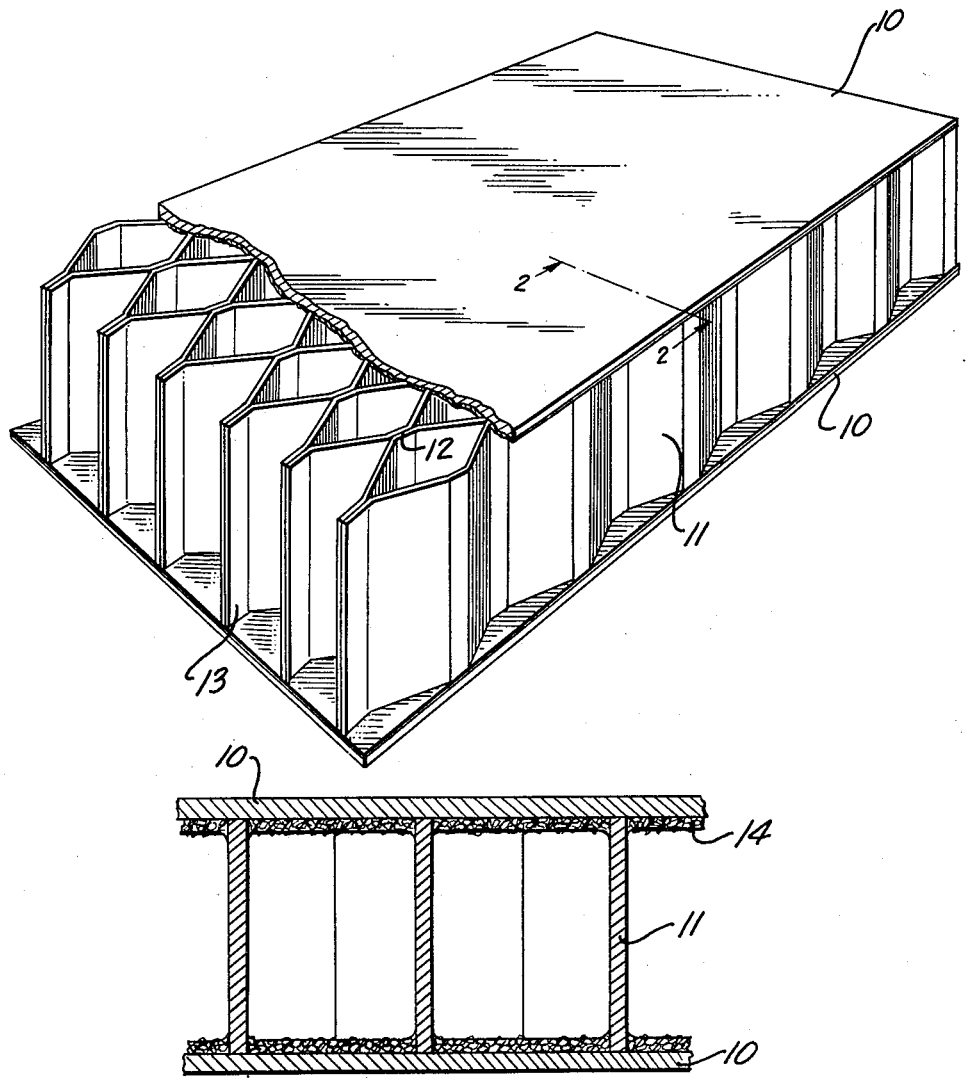

INVENTOR.
BRUCE E. DEL MAR
BY Edwin Coates
ATTORNEY

Patented June 12, 1951

2,556,470

UNITED STATES PATENT OFFICE 2,556,470

HEAT INSULATING STRUCTURAL PANEL

Bruce E. Del Mar, Los Angeles, Calif., assignor to Douglas Aircraft Company, Inc., Santa Monica, Calif.

Application November 22, 1947, Serial No. 787,525

2 Claims. (Cl. 154—44)

This invention relates to structural elements and more particularly to such an element having relatively low heat transmission properties.

The structural element of the present invention in the broadest aspects thereof, comprises a panel or the like formed as a sandwich laminate consisting of a pair of relatively thin skins or plates separated by a low density stabilizing core, the opposite surfaces of which are bonded to the skins or sheets. The core comprises a reticulated web or honeycomb construction forming a plurality of cells, the walls of which extend substantially normal to the skins and thus resist compression loads applied to the panel. The core, furthermore, acts as a shear carrying element between the two skins and acts further to stabilize the skins against local buckling or stresses.

Such sandwich laminates have been heretofore proposed and are being used in various fields in rapidly increasing quantities. The use, however, is restricted to applications where no thermal insulation is necessary, as it has been found that the core itself has a "K" factor only slightly lower than that of solid lumber.

Although the material of the core is one having a relatively low thermal conductivity, considerable heat energy is transmitted by radiation through the dead air spaces formed by the cells after the skins or plates have been bonded to the opposite surfaces of the core. This heat loss has been one deficiency of previously proposed panels of like construction and is obviated by the panel of the present invention, wherein radiation losses are materially reduced, to the end that the panel has a "K" factor substantially lower than prior panels of similar construction. The thermal transmission properties of the panel of the present invention have been reduced without increasing the weight of same, so that the panel is particularly adapted for use in transportation fields where weight is a considerable factor.

Radiation losses of the panel of the present invention are kept to a minimum by forming reflecting surfaces at the bond or jointure between the skins and the core. This results in a two-fold advantage, for the skin of the higher temperature is thus made a poor radiator, while the surface of the other skin will reflect a larger portion of the radiant heat incident thereon back into the core.

In the embodiment of the invention illustrated, the reflecting surfaces are formed by incorporating into the bonding agent used to secure the skins to the core a material having a relatively high reflectivity. The material incorporated into the bonding agent may consist of aluminum powder or flakes and should be present in the bonding agent in sufficient quantities to insure that high reflective surfaces will be formed when the skins are bonded to opposite surfaces of the core.

In one embodiment of the panel of the present invention illustrated herein, radiation losses are further reduced by forming the core as two reticulated segments separated by a plate-like member bonded between the two segments forming the core. In this embodiment of the invention the bonding agent also includes material having a high reflectivity, to the end that reflecting surfaces are formed on opposite sides of the plate-like member, as well as at the jointure between the core and the skins. As should be understood, the plate-like member reduces the size of the dead air spaces formed by the cells of the core and thus further reduces heat transmission across the panel.

Other features and advantages of the present invention will be apparent from the following description taken in connection with the accompanying drawing in which:

Figure 1 is a perspective view of a panel embodying the present invention with one skin broken away to more clearly illustrate the interior of the core;

Figure 2 is a fragmentary sectional view, taken along line 2—2 of Figure 1, of the panel of the present invention in which the layer of bonding agent and the material added thereto is shown in an enlarged, exaggerated scale.

Figure 3:
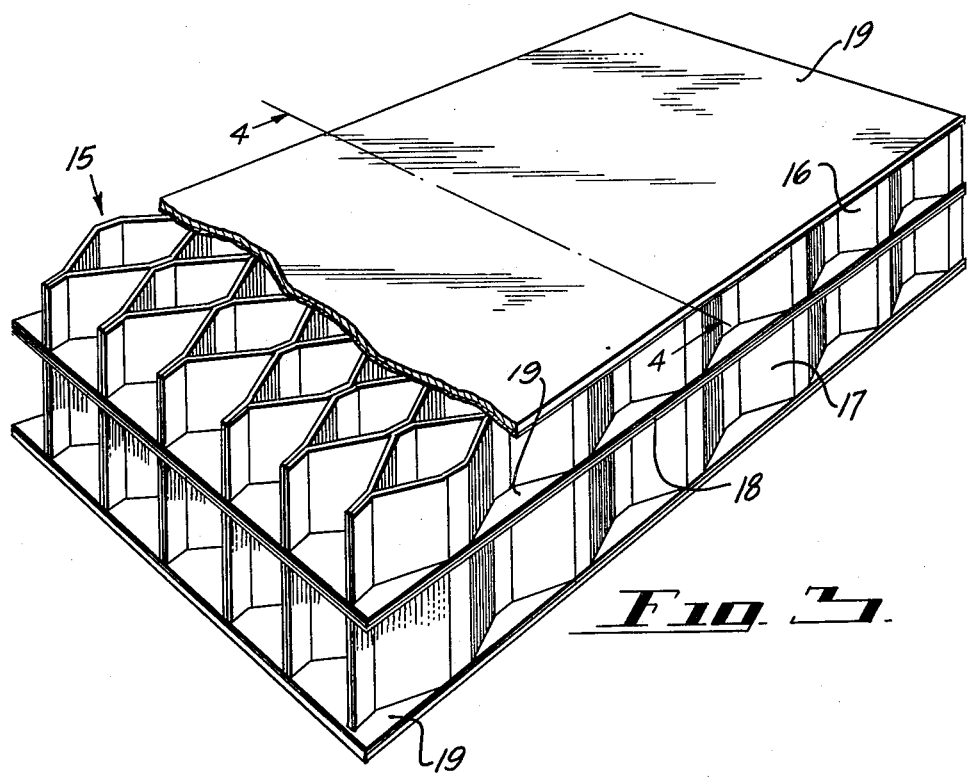
Figure 3 is a view similar to Figure 1 but showing a modified form of the panel of the present invention.

One embodiment of the panel of the present invention referring now to the drawing and more particularly to Figures 1 and 2 thereof, comprises a pair of relatively thin skins or plates 10 between which is sandwiched a multi-cell core element 11, the opposite surfaces of which are permanently bonded to adjacent faces of the skins. The core element, in the broadest aspects thereof, comprises a reticulated member having a plurality of open-ended cells, the walls of which extend normal to the plates and thus resist loads laterally applied to the panel.

A number of methods can be used to form the core which comprises a plurality of strips of flexible material having a low thermal conductivity, each strip connected to one of the adjacent strips at suitably spaced lines of jointure 12 and to the other adjacent strip along lines of jointure 13. It will be seen that the lines of jointure 12 are staggered with respect to lines of jointure 13, preferably by an amount substantially equal to one half of the distance between adjacent lines of jointure 12 and 13.

The lines of jointure may be formed by applying lines of some suitable adhesive to opposite surfaces of the individual strips of paper with the lines of adhesive on one surface of each strip staggered relative to the lines of adhesive applied to the opposite surface of the strip. The strips may then be superimposed one on the other to secure the same together along the lines of adhesive. The product thus formed after the adhesive has been set can be expanded to form the reticulated core shown in Figure 1 having a plurality of staggered rows of cells, the walls of which extend normal to the outer faces of the core.

The core may also be formed by applying to opposite faces a single moving web of flexible material longitudinally extending lines of adhesive with the lines of one face laterally spaced in staggered relationship to the lines on the other face of the web. The web may then be fan folded to form a compact fan folded mass, the individual folds of which are adhesively secured together along lines of jointure established by the lines of adhesive applied to the web. By a suitable cutting or grinding operation, the interconnected folds can be separated to produce a product which can be expanded as in the first described method of forming the core.

The core, either during the expanding operation or subsequent thereto, is impregnated with some suitable material to render the core impervious to moisture and to strengthen the material of same. It is now preferred to impregnate the material core with a thermo-setting phenolic resin, although other materials can be used to bring about the end result desired.

The material used to form the core should be one which has a relatively low thermal conductivity. Thus, as the walls of the cells formed are relatively thin, it will be seen that very little heat will be transmitted across the core by conduction through the walls of the cells of the same. Although the cells form dead air spaces, heat energy will nevertheless be transmitted from one plate to the other by radiation. The present invention is concerned with reducing losses brought about by radiation, and it will be shown that in the panel of the present invention a substantial reduction of heat transmission by radiation is had.

To this end reflecting surfaces are formed at the jointure between the skins or plates 10 and the opposite surface of the core. Although such surfaces may be formed by any means suitable, it is now preferred to form these reflecting surfaces by incorporating into the bonding agent used to bond the skins or plates to the opposite surfaces of the core a material having a relatively high reflectivity, so that after the bond between the skins and the core has been effected, the exposed surfaces of the bonding agent carried by the skins are reflective.

In forming the panel of the present invention, after the core has been impregnated, a suitable bonding agent 14 carrying the reflective material is applied to the entire surface of one face of the skins 10, whereupon the skins are arranged on opposite sides of the core 11 and the coated faces of the skins are brought into engagement with opposite surfaces of the core. The bonding agent 14 is preferably a thermosetting phenolic resin, and the bond between the skins and the core is completed under heat and pressure.

Although any material which will bring about the result desired can be added or incorporated into the bonding resin, it is now preferred to use either aluminum powder or flakes. Aluminum, as it is highly resistant to corrosion, is admirably adapted for this use, for it retains its reflective properties even after relatively long periods of use. The aluminum should be present in the bonding agent in sufficient quantity to insure that a good reflecting surface will be formed after the agent has set and hardened.

The reflecting surfaces formed serve a twofold purpose, for the resin carried by the skin of the higher temperature presents a reflecting surface which renders that skin a poor radiator. The emissivity of the skin of the higher temperature is thus reduced, which results in a reduction in heat energy radiated by that skin.

The reflecting surface presented by the resin carried by the other skin will, as should be understood, reflect back into the core a substantial portion of all radiant heat incident thereon. Thus heat energy transmitted by radiation from one skin to the other of prior panels is considerably reduced in the panel of the present invention. As a large part of the heat lost in the panels of like construction previously proposed is prevented from being radiated through the panel of the present invention, the latter has a relatively high thermal insulation property and a relatively low "K" factor.

Figure 4:
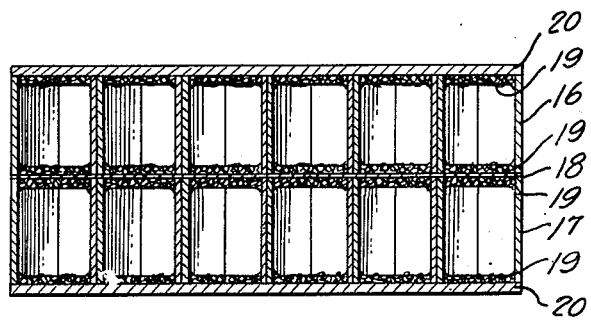
Figure 4 is a section taken along line 4—4 of Figure 3 again showing the bonding agent, and the material added thereto, in an enlarged, exaggerated scale.

In the embodiment of the invention shown in Figures 3 and 4, the core 15 is formed of two segments 16 and 17 of identical size and shape separated by an impervious sheet-like member 18 co-extensive with adjacent faces of the two core segments to which it is bonded. The sheet-like member may take any form desired, and as it carries no loads, it may be made relatively thin. The member may be so thin as to approach a membrane in pliability, for it is stablized on both sides thereof by the core segments to which it is bonded.

Its primary purpose in the invention herein disclosed is to divide and reduce the size of the dead air spaces formed by the cells of the core and to present another radiation shield within the core. It will be noted that the core segments are substantially equal in thickness so that the volume of the dead-air spaces in a panel of a particular size of this embodiment of the invention is substantially one half that of the spaces of a panel of like size of the embodiment of the invention shown in Figures 1 and 2. The thermal insulation property of dead air is too well known to be further expounded upon here, and it will be seen that the membrane-like member will co-act with the cells of the two core segments to lower the heat transmission properties of the panel.

To further augment the reduction of the heat transmission across the panel, either aluminum powder or flakes, or both, is also added to the resin 19 used to bond not only the skins 20 to the outer faces of the core segments, but as well that used to bond the membrane-like member 18 to adjacent faces of the core member. The reflecting surfaces thus formed act as do the reflecting surfaces of the embodiment of the panel earlier described herein to reduce radiant heat transmission across the panel.

In both embodiments of the invention illustrated, it is obvious that the reflecting surfaces could be directly formed on the skins and membrane-like member by polishing selected faces thereof and using a transparent bonding agent to secure the skins and the member to the core member. Furthermore, a bonding agent could be selected which had the characteristic of forming a relatively high reflective surface after it had set and hardened.

It will be seen, in both embodiments of the invention illustrated herein, that the heat transmission properties of the panel have been considerably reduced over panels of like construction heretofore proposed. The thermal insulation properties of the panel have been increased without materially increasing the weight of the panel, so that the same is particularly well adapted to be used in the transportation fields, where it is economically desirable to keep the weight of all structural members at a minimum.

Although the now preferred embodiments of the present invention have been illustrated and described herein, it is to be understood that the invention is not to be limited thereto for the same is susceptible to changes in form and detail within the scope of the appended claims.

I claim:

1. A structural panel of the type described, comprising: a reticulate core having a plurality of cells open at each end and extending substantially normal to the opposite faces of said core and the walls of which have a high thermal-resistivity from end to end of each cell; a plate disposed across each of the opposite faces of said core; and, carried by the entire inner face of each plate and surrounding each cell end, an adhesive and radiant energy reflective substance including a bonding material carrying a myriad of metallic granules having reflecting surfaces facing inwardly of each cell end and adapted when set to maintain the cell ends spread apart and united to the adjacent plates; whereby to inhibit radiant heat loss at the one plate and to reflect radiant heat at the other plate and to inhibit heat conduction through the cell walls to said plates, thereby to substantially completely thermally insulate the panel from radiant and conductive heat transmission.

2. A structural panel of the type described, comprising: a reticulate core having a plurality of cells open at each end and extending substantially normal to opposite faces of said core and the walls of which are bare and non-metallic and have a high thermal resistivity from end to end of each cell; a smooth heat-conducting and radiant heat energy transmitting and absorbing metallic plate disposed across each of the opposite faces of said core; and, carried by the entire inner face of each plate and surrounding each cell end, an adhesive and radiant energy reflective substance including a phenolic resin bonding material carrying a myriad of granules of ultra finely sub-divided aluminum having surfaces facing inwardly of each cell end and adapted when set to maintain the cell ends spread apart and united to the adjacent plates; whereby to inhibit radiant heat loss at the one plate and to reflect radiant heat at the other plate and to prevent heat conduction through the said smooth flat metallic plates and the cell walls, thereby to substantially completely thermally insulate the panel from radiant and conductive heat energy transmission.

BRUCE E. DEL MAR.

REFERENCES CITED

The following references are of record in the file of this patent:

UNITED STATES PATENTS

| Number | Name | Date |
|---|---|---|
| 2,001,632 | Schlichting | May 14, 1935 |
| 2,389,641 | Sarbach | Nov. 27, 1945 |
| 2,428,979 | May | Oct. 14, 1947 |